United States Patent [19]

Schnell

[11] Patent Number: 5,333,294

[45] Date of Patent: Jul. 26, 1994

[54] CONFIGURABLE DATA WIDTH DIRECT MEMORY ACCESS DEVICE WITH A READ ADDRESS COUNTER AND A WRITE ADDRESS COUNTER WHICH INCREMENTS THE ADDRESSES BASED ON THE DESIRED DATA TRANSFER WIDTH

[75] Inventor: Arnold T. Schnell, Houston, Tex.

[73] Assignee: Compaq Computer Corporation, Houston, Tex.

[21] Appl. No.: 594,601

[22] Filed: Oct. 9, 1990

[51] Int. Cl.[5] .................... G06F 13/28; G06F 12/00
[52] U.S. Cl. ................... 395/425; 395/400;
395/500; 364/DIG. 1; 364/238.4; 364/240.3;
364/242.3; 364/242.31
[58] Field of Search ............... 395/400, 425;
364/200 MS File, 900 MS File

[56]   References Cited
U.S. PATENT DOCUMENTS

| | | | |
|---|---|---|---|
| 4,221,933 | 9/1980 | Cornell et al. | 379/84 |
| 4,272,810 | 6/1981 | Gates et al. | 395/425 |
| 4,307,454 | 12/1981 | Haben et al. | 395/425 |
| 4,733,294 | 3/1988 | Wesoldwski | 358/17 |
| 4,878,166 | 10/1989 | Johnson et al. | 395/425 |
| 4,924,427 | 5/1990 | Savage et al. | 395/425 |
| 4,974,074 | 11/1990 | Tenma | 358/92 |
| 5,109,332 | 4/1992 | Culley | 395/325 |
| 5,142,672 | 8/1992 | Johnson et al. | 395/500 |
| 5,187,783 | 2/1993 | Mansfield et al. | 395/425 |
| 5,220,651 | 6/1993 | Larson | 395/250 |

OTHER PUBLICATIONS

Monolithic Memories, *LSI data book,* 7th edition; First-In First-Out (FIFO) Cascadable Memory, pp. 8-19 to 8-29, 1986.
Monolithic Memories, data sheet on FIFI RAM Controller, 1986.

*Primary Examiner*—Joseph L. Dixon
*Assistant Examiner*—Frank J. Asta
*Attorney, Agent, or Firm*—Pravel, Hewitt, Kimball & Krieger

[57]   ABSTRACT

A system where counters which increment based on a desired data transfer width are used to control addresses provided to memory devices. Transceivers are located on each byte lane between the system data bus and the internal data bus, with copy transceivers connected between the various byte lanes of the internal bus. The various devices are controlled so that data can be transferred in one, two or four byte increments and yet the memory devices are fully utilized. Separate counters are used for read and write directions. Circuitry is used to determine system memory data width and addressing format so that the desired data transfer width can be determined and set to allow the highest possible data transfer rate.

4 Claims, 3 Drawing Sheets

CONFIGURABLE DATA WIDTH DIRECT MEMORY ACCESS DEVICE WITH A READ ADDRESS COUNTER AND A WRITE ADDRESS COUNTER WHICH INCREMENTS THE ADDRESSES BASED ON THE DESIRED DATA TRANSFER WIDTH

BACKGROUND OF THE INVENTION

1. Field of the Invention

The invention relates to data transfers over busses, and more specifically to systems which can change the data width used in transferring the data.

2. Description of the Related Art

Data transfers between input/output (I/O) devices in computers and memory in the computers are always desired to be as fast as possible. To this end direct memory access (DMA) controllers have been developed so that these transfers can take place without placing a large burden on the system processor.

These transfers take place over a bussing arrangement at predefined speeds. For example, in the International Business Machines Corp. (IBM) PC, 20 bits of address, eight bits of data and a basic timing cycle of approximately 1 microsecond per cycle (for an 8 MHZ bus clock rate) were used in DMA transfers. This data transfer rate was improved in the IBM PC/AT by the use of a 16 bit data transfer. However, this still left the fastest basic rate available at 2 Mbytes per second which became slow as the speed of the various I/O devices increased and the processors became wider and faster.

To help resolve this problem the Extended Industry Standard Architecture (EISA) was developed. The EISA specification Version 3.1 is provided as Exhibit A in U.S. Pat. No. 5,101,492, filed Sep. 3, 1989, issued Mar. 31, 1992, and entitled Data Redundancy and Recovery Protection, and is incorporated by reference in its entirety. The EISA specification defines several very high speed DMA transfer options referred to as burst transfers. These transfers allow data to be transferred every BCLK signal cycle, with the BCLK signal being the basic synchronizing signal of the bus. The transfers can be either 16 or 32 bits wide for burst transfers, but if the responding memory device does not have a width consistent with the I/O device or the memory device it cannot burst, and then the transfer rate is reduced. In the cases of mismatched data width, the rate drops appreciably because the bus controller must perform assembly/disassembly cycles as defined by the EISA specification, which slow down each transfer. If the memory device is the same width but does not support the burst function, the transfer rate is reduced, but only to that of the basic, default timing, which is not as appreciable a drop as in the mismatched cases. Thus, while it is desirable to use burst modes, the communicating devices must be of compatible widths or the advantage will be lost.

Conventionally two methods were used to buffer data between the memory and the I/O device. The first method was used with small buffers, while the second method was used with larger buffers. When only the smaller buffers are needed, a first in first out (FIFO) circuit was used. This FIFO consisted of a series of stacked data registers which passed data from one register to another as the data exited or entered the FIFO. Typical FIFO devices were 8 bits wide and 64 positions deep. For a 32 bit buffer four of such devices were required if the depth was sufficient. However, these FIFO devices were uni-directional, which means that data enters in one side and exits the other, so that an additional set of devices was necessary to handle data flow in the opposite direction. Alternatively, rerouting logic was developed to route logic through the same chips but then bi-directional, interleaved operation was lost.

For larger buffers of the second method a FIFO random access memory (RAM) controller (FRC) device was used. This FRC device was used in conjunction with conventional static random access memory (SRAM) devices. The FRC device provided a larger FIFO by using each SRAM location as a register. The SRAM address was controlled from within the FRC device so that rather than passing data from one register to another, an address pointer was incremented. Internal counters in the FRC device incremented with each cycle in the transfer. A single FRC chip could control any single data width since it only generated addresses. However, the FRC device is unidirectional and so external logic or two devices were needed to provide by-directional capability.

Problems did arise when multiple widths of information had to be passed using an FRC device. If the FRC device was configured such that the SRAM's were designed to be 32 bits wide, data transfers occurred optimally for 32 bit transfers. However, if 16 bit data had to be transferred using this 32 bit configuration, data was not transferred into 16 bits of the SRAM and so the effective buffer space was reduced to one-half the total supplied space. Alternatively, the SRAM's could be configured for 16 bit operation, but then the FRC device would not properly increment addresses for 32 bit operation. Therefore the FRC device could only work for fixed data widths, unless buffer size reduction was acceptable.

SUMMARY OF THE INVENTION

The present invention includes a system for allowing the data width of an I/O or DMA device to be matched to the memory, with the counters being utilized to implement the FRC being flexible to count in different intervals depending upon the data width being utilized. Additionally, logic controls the transfer of data between the various data byte paths or lanes so that the data is properly stored in the SRAM, so that full buffer utilization is developed. Additionally, dual porting logic is provided so that the SRAM's can be accessed by both the DMA transfer devices forming the FIFO and by the on-board controller, generally a microprocessor.

Two counters are utilized which receive two input bits to determine the step size or data width. These counters include inputs so that they are independent to allow read and write transfers to take place independently without requiring clearing and resetting of the other counter. This also allows bi-directional, interleaved capabilities and flexibility in the actual data width being received without sacrificing buffer size utilization. Also included is a latching and buffering arrangement to allow the system processor to determine the data width of the memory with which the DMA transfer is occurring to allow optimal sizing of the I/O device data width to match that of the memory unit to allow burst transfers or to not require data assembly cycles.

BRIEF DESCRIPTION OF THE DRAWINGS

A better understanding of the present invention can be obtained when the following detailed description of the preferred embodiment is considered in conjunction with the following drawings, in which.

DESCRIPTION OF THE PREFERRED EMBODIMENT

Figure 1:
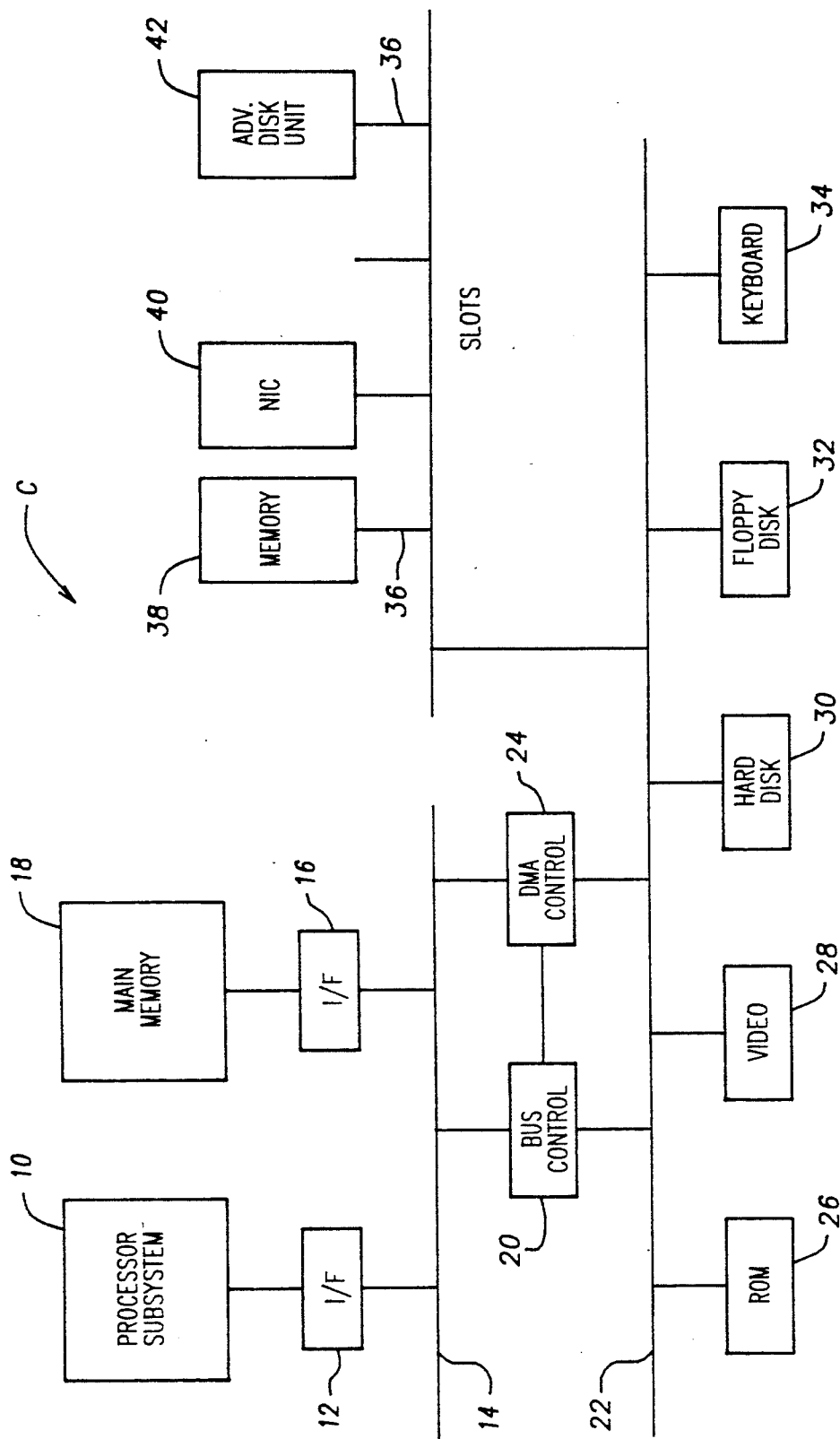
FIG. 1 is a schematic block diagram of a computer system incorporating the present invention.

Referring now to FIG. 1 the letter C generally represents a computer system incorporating a configurable data width direct memory access system according to the present invention. The processor subsystem 10, which can contain a microprocessor, a numeric coprocessor and cache controller circuitry, is connected through an interface 12 to a host bus 14. Preferably the processor subsystem 10 is 32 bits wide, both address and data. Also connected to the host bus 14 is a memory interface 16 which is connected to the main memory 18 of the computer system C. This main memory 18 is preferably also 32 bits wide and is of a speed sufficient to operate with the processor subsystem 10. A bus controller 20 is connected to the host bus 14 and an input-/output bus 22, one embodiment of which is the EISA bus. Connected to the bus controller 20 and to the host and I/O buses 14 and 22 is a DMA controller 24 to perform direct memory access operations in the computer system C. Connected to the I/O bus 22 are exemplary units contained in the computer system C such as the read only memory or ROM 26, the video system 28 which allows images to be displayed to the user, a conventional hard disk unit 30, a floppy disk unit 32 and a keyboard system 34. Also connected to the I/O bus 22 are a series of slots 36 which allow interchangeable circuit boards to be installed. In the preferred embodiment these are EISA slots to allow advanced circuit boards to be installed. In the examples shown in FIG. 1, a memory card 38, a network interface card 40 and an advanced hard disk unit 42 are installed in slots 36. The configurable data width DMA system according to the present invention would be present on the network interface card 40 or the advanced disk unit 42, as examples. The memory 38 could be any of the allowable data widths, that is 8, 16 or 32, that operate according to the EISA or ISA standard, or appropriate other convention.

Figure 2:
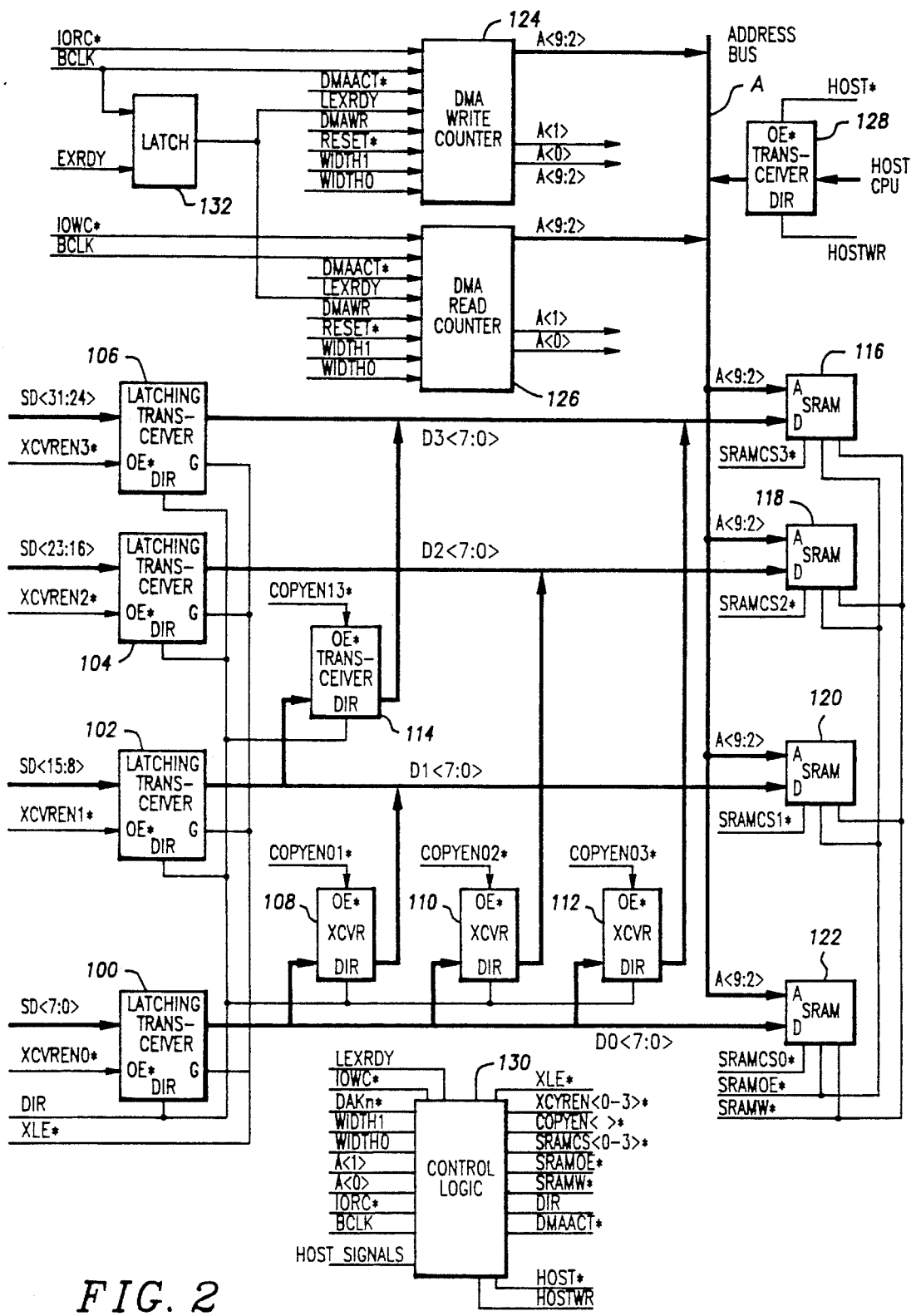
FIG. 2 is a schematic block diagram of circuitry performing counting and data copying operations according to the present invention.

FIG. 2 is a block diagram of the logic utilized to perform the variable data width transfers. The four byte lanes of the system data bus SD<7:0>, SD<15:8>, SD<23:16>, and SD<31:24>, present as part of the I/O bus 22, are connected to four latching transceivers 100, 102, 104 and 106, respectively referred to as the 0, 1, 2 and 3 lane transceivers. A second series of transceivers 108, 110, 112 and 114, referred to as the copy transceivers, are connected between various outputs of the data bus transceivers 100-106. For example, the 01 transceiver 108 is connected to allow data to be transferred from the 0 lane to the 1 lane, while the 02 transceiver 110 is connected to allow data to be transferred from the 0 lane to the 2 lane. In a like manner, the 03 transceiver is connected to allow data to be transferred from the 0 lane to the 3 lane and the 13 transceiver 114 is connected to allow data to be transferred from the 1 lane to the 3 lane. In this manner if data is received in byte or word format and must be transferred out in byte or word or double word format, the data can be present in the proper byte lanes for presentation to a series of memory devices 116, 118, 120 and 122 which form the memory array used to store the incoming or outgoing data. For instance, the data byte lane 3 is connected to SRAM 116, while data byte lane 2 is connected to SRAM 118, data byte lane 1 is connected to SRAM 120 and data lane 0 is connected SRAM 122. In this way the memory devices 116-122 can be configured for 32 byte width or, with proper operation of the copy transceivers 108-114, can be organized in byte or word format. The address inputs to the memory devices 116-122 are connected to the address outputs of two counters 124 and 126 by means of an internal address bus A. The write counter 124 is used if data is being written to memory from the I/O device, while the read counter 126 is used if data is being read from the memory to the I/O device. In the preferred embodiment the memory devices 116-122 are 256×8 bit devices but other devices of larger sizes can be utilized as desired by changing the number of addresses utilized by the counter 124 and 126 and the memory devices 116-122. Also connected to the internal address bus A is a transceiver 128 which is also connected to the host processor or CPU located on the I/O board. This allows the host CPU to provide addresses to the memory devices 116-122, thus performing a dual porting function.

The output enable, direction, latch, chip select and write signals for the various devices are provided by the output of control logic 130, which receives appropriate control inputs. The control logic 130 also performs the arbitration or dual port functioning to allow the memory devices 116-122 to be dual ported and available to both the host CPU and to the DMA interface.

The read and write counters 126 and 124 receive various signals, such as the WIDTH0 and WIDTH1 signals, which indicate the desired operating width, which is preferably the width of the memory device from which data is being transferred or to which may the data is being transferred. A RESET* signal is used to reset the counters 124 and 126, while the BCLK signal available from the EISA bus is used to advance the counters 124 and 126. A signal referred to as DMAWR is provided to both counters 124 and 126 to indicate the direction of the DMA transfer which is occurring, while a signal referred to as DMAACT* signal is provided by the control logic 130 to indicate that a DMA transfer is active. A signal referred to as LEXRDY or latched extended ready is developed by a latch 132, which is gated by the BCLK signal and receives at its D input the EXRDY signal. This latching is provided so that should the EXRDY signal be removed at an earlier time then desired, the LEXRDY signal is available for use by the counters 124 and 126. The write counter 124 also receives the IORC* signal, while the read counter 126 receives the IOWC* signal to allow synchronization with the bus cycles. The read and write counters 126 and 124, in addition to producing address signals which are provided to the memory devices 116-122, also produce two subaddressing signals referred to as A<1:0> which are provided to the control logic 130 to help determine which of the various memory devices 116–122 is to be selected and if the various copy buffers 108–114 are to be utilized.

The DMA write counter 124 and the DMA read counter 126 are preferably developed from programmable array logic devices (PAL's), as is the control logic 130. Therefore, various equations are utilized to program the programmable array logic devices to perform the necessary functions. These equations are described in detail in the following sections. Not shown in FIG. 2 are 3 bits of data latch, whose outputs are provided via an I/O port to the control logic 130 and the counters 124 and 126. The logic is not shown because it is well known. The 3 bits stored in these latches are the WIDTH0, WIDTH1 and DMAWR signals, which indicate respectively the width of the desired data transfer and its direction.

For the purposes of this explanation, in the preferred embodiment the DMA controller logic has access to the memories 116–122 whenever DMA is active and at other times the host CPU has access. Thus, if a DMA transfer is in operation, the host CPU cannot access the memory 116–122, but must wait until the transfer is completed. With this convention, the signal DMAACT*, which indicates when low that a DMA transfer is active, is equal to the DAKn* signal, which indicates that the DMA request from the particular channel n has been acknowledged and a transfer is in progress.

Each of the latching data transceivers 100–106 contains a low true output enable input to which is tied a signal referred to XCVREN<0:3>*. These signals are developed in the control logic 130 as follows:

$$XCVREN3^* = DMAACT \cdot WIDTH1 \cdot WIDTH0$$

$$XCVREN2^* = DMAACT \cdot WIDTH1 \cdot WIDTH0$$

$$XCVREN1^* = (DMAACT \cdot WIDTH1 \cdot WIDTH0) + (DMAACT \cdot WIDTH1^* \cdot WIDTH0^*)$$

$$XCVREN0^* = DMAACT$$

where WIDTH1 and WIDTH0 are interpreted as follows:

| WIDTH1 | WIDTH0 | DATA WIDTH |
| --- | --- | --- |
| 0 | 0 | 16 bits |
| 0 | 1 | 8 bits |
| 1 | 0 | Not Allowed |
| 1 | 1 | 32 bits |

Thus the appropriate data transceivers 100–106 for the desired data width are enabled when a DMA operation is active. It is noted that a signal mnemonic followed by an asterisk is the inverse of the same mnemonic without the asterisk and generally represents a signal which is true or active when low.

The latching transceivers 100–106 further include a latch input which receives a signal referred to as XLE*. This signal is developed as follows:

$$XLE^* = ((DMAACT \cdot DMAWR \cdot BCLK \cdot LEXRDY) + (DMAACT \cdot DMAWR^*))^*$$

so that the latches are transparent during DMA read operations and latched on the first falling edge of the BCLK signal of each cycle during DMA write operations.

The output enable signals for the copy transceivers 108, 110, 112 and 114 are as follows:

$$COPYEN01^* = DMAACT \cdot WIDTH1^* \cdot WIDTH0 \cdot A1^* \cdot A0$$

$$COPYEN02^* = (DMAACT \cdot WIDTH1^* \cdot WIDTH0 \cdot A1 \cdot A0^*) + (DMAACT \cdot WIDTH1 \cdot WIDTH0^* \cdot A1)$$

$$COPYEN03^* = DMAACT \cdot WIDTH1^* \cdot WIDTH0 \cdot A1 \cdot A0$$

$$COPYEN13^* = DMAACT \cdot WIDTH1^* \cdot WIDTH0^* \cdot A1$$

where A1 and A0 are the least significant bits of the address provided by the counter 124 or 126 which is active. Thus, depending on the data transfer width and the particular double word segment address being presented, data is properly transferred between the data byte lanes and the memories 116–122.

All of the transceivers 100, 102, 104, 106, 108, 110, 112, and 114 use a single DIR signal to indicate the direction in which they are to pass data. The DIR signal is developed as follows:

$$DIR = ((DMAACT \cdot IORC) + (DMAACT \cdot LIORC))^*$$

where IORC* is the EISA bus I/O read strobe and LIORC* is a version of the IORC* signal latched by the BCLK signal, the basic clocking signal of the EISA bus. Thus during read operations the data is transferred from the I/O bus 22 to the memories 116–122 through the transceivers 100–106 and 108–114.

The equations for output enabling, selecting and writing to the memory devices 116, 118, 120 122 are as follows:

| | |
| --- | --- |
| SRAMOE* | = ((DMAACT . IORC) +(DMAACT . LIORC))* |
| SRAMW* | = (DMAACT . IOWC . BCLK* . LEXRDY)* |
| SRAMCS3* | = ((DMAACT . WIDTH1 . WIDTH0) + (DMAACT . WIDTH1* . WIDTH0* . A1) + (DMAACT . WIDTH1* . WIDTH0 . A1 . A0))* |
| SRAMCS2* | = ((DMAACT . WIDTH1 . WIDTH0) + (DMAACT . WIDTH1* . WIDTH0* . A1) + (DMAACT . WIDTH1* . WIDTH0 . A1 . A0*))* |
| SRAMCS1* | = ((DMAACT . WIDTH1 . WIDTH0) + (DMAACT . WIDTH1* . WIDTH0* . A1*) + (DMAACT . WIDTH1* . WIDTH0 . A1* . A0))* |
| SRAMCS0* | = ((DMAACT . WIDTH1 . WIDTH0) + (DMAACT . WIDTH1* . WIDTH0* . A1*) + (DMAACT . WIDTH1* . WIDTH0 . A1* . A0*))* | where A1 and A0 are the respective 1 and 0 address position signals from the counter 124 or 126 addressing the memory devices 116–122. Thus on DMA read operations the data is latched into the appropriate memory 116–122 at the appropriate time, while on DMA write operations the data is provided from the appropriate memory 116–122.

The counters 124 and 126 are also formed from programmable devices in the preferred embodiment and so equations are appropriate for describing their operation also. The operation of the counters 124 and 126 is complicated by the possibility of backoff or assembly cycles on the EISA bus during the transfer operation. While no backoffs would be required if the memory and I/O devices were properly data width matched, such may not occur in practice, particularly until the width of the memory is determined and so the counters 124 and 126 must be able to understand the backoff or assembly cycles. In addition, the counters 124 and 126 must operate somewhat differently because one is for DMA write operations where data is transferred from the I/O device to memory and the other counter is configured for DMA read operations where data is transferred from the memory to the I/O device.

The various equations for the DMA write counter 124 are as follows:

$$ADDROE = DMAACT \cdot DMAWR$$

so that the address values are being provided by the counter 124 only when a DMA cycle is active and writes to memory are to occur. A signal referred to as the CLOCKCMD signal is used to advance the counter 124 and is developed as follows:

```
CLOCKCMD  = ((DMAACT . DMABU* . IORC)
            + (DMAACT . DMABU . PRELATCH .
            IORC . LEXRDY . BCLK*))*
```

The DMABU signal is a signal which indicates that the DMA device can burst and is preferably developed by the output of a register on the DMA device. By use of a register the DMA device can be set to be non-bursting, but this condition is not preferred because then the burst possibility is removed. Thus the first term is used when the DMA device is not set up in burst mode, while the second term is used to advance the counter 124 during burst mode setup cases, the preferred setup. The PRELATCH signal is developed as follows:

$$PRELATCH := DMAACT \cdot IORC$$

where the clocking signal is BCLK signal. The PRELATCH signal is developed to prevent glitches on the CLOCKCMD signal, particularly at the beginning of the burst cycle where the IORC* signal may go active while the BCLK signal is still high due to timing skew or race conditions.

The counter 124 counts by ones when the width is 8 bits, by twos when the width is 16 bits and by fours when the width is 32 bits. This design assumes that the counter 124 starts at zero after reset. The counting equations for the counter 124 are as follows:

```
A0   := A0FB*
A0C     ((CLOCKCMD* . WIDTH1* . WIDTH0) +
         (A0FB . CLOCKCMD* . WIDTH1* . WIDTH0*) +
         (A0FB . CLOCKCMD* . WIDTH1 . WIDTH0))*
A1   := A1FB*
A1C  = ((A0FB . CLOCKCMD* . WIDTH1* . WIDTH0) +
         (CLOCKCMD* . WIDTH1* . WIDTH0*) +
         (A1FB . CLOCKCMD* . WIDTH1 . WIDTH0))*
A2   := A2FB*
A2C  = ((A0FB . A1FB . CLOCKCMD* . WIDTH1* .
         WIDTH0) +
         (A1FB . CLOCKCMD* . WIDTH1* .
         WIDTH0*) +
         (CLOCKCMD* . WIDTH1 .
         WIDTH0))*
A3   := A3FB*
A3C  = ((A0FB . A1FB . A2FB . CLOCKCMD* . WIDTH1*
         . WIDTH0) +
         (A1FB . A2FB . CLOCKCMD* . WIDTH1* .
         WIDTH0*) + (A2FB . CLOCKCMD* . WIDTH1 .
         WIDTH0*))
A4   := A4FB*
```

```
                                -continued
A4C  = ((A0FB . A1FB . A2FB . A3FB . CLOCKCMD* .
         WIDTH1* . WIDTH0) +
         (A1FB . A2FB . A3FB . CLOCKCMD* .
         WIDTH1* . WIDTH0*) +
         (A2FB . A3FB . CLOCKCMD* .
         WIDTH1 . WIDTH0))*
A5   := A5FB*
A5C  = ((A0FB . A1FB . A2FB . A3FB . A4FB
         CLOCKCMD* . WIDTH1* . WIDTH0) +
         (A1FB . A2FB . A3FB . A4FB .
         CLOCKCMD* . WIDTH1* . WIDTH0*) +
         (A2FB . A3FB . A4FB .
         CLOCKCMD* . WIDTH1 . WIDTH0))*
A6   := A6FB*
A6C  = ((A0FB . A1FB . A2FB . A3FB . A4FB . A5FB
         . CLOCKCMD* . WIDTH1* . WIDTH0) +
         (A1FB . A2FB . A3FB . A4FB . A5FB
         . CLOCKCMD* . WIDTH1* . WIDTH0*) +
         (A2FB . A3FB . A4FB . A5FB
         . CLOCKCMD* . WIDTH1 . WIDTH0))*
A7   := A7FB*
A7C  = ((A0FB . A1FB . A2FB . A3FB . A4FB . A5FB
         . A6FB . CLOCKCMD* . WIDTH1* . WIDTH0) +
         (A1FB . A2FB . A3FB . A4FB . A5FB
         . A6FB . CLOCKCMD* . WIDTH1* . WIDTH0*) +
         (A2FB . A3FB . A4FB . A5FB
         . A6FB . CLOCKCMD* . WIDTH1 . WIDTH0))*
A8   := A8FB*
A8C  = ((A0FB . A1FB . A2FB . A3FB . A4FB . A5FB
         . A6FB . A7FB . CLOCKCMD* . WIDTH1* . WIDTH0)
         +
         (A1FB . A2FB . A3FB . A4FB . A5FB
         . A6FB . A7FB . CLOCKCMD* . WIDTH1* .
         WIDTH0*) +
         (A2FB . A3FB . A4FB . A5FB
         . A6FB . A7FB . CLOCKCMD* . WIDTH1 .
         WIDTH0))*
A9   := A9FB*
A9C  = ((A0FB . A1FB . A2FB . A3FB . A4FB . A5FB
         . A6FB . A7FB . A8FB . CLOCKCMD* . WIDTH1* .
         WIDTH0) +
         (A1FB . A2FB . A3FB . A4FB . A5FB
         . A6FB . A7FB . A8FB . CLOCKCMD* . WIDTH1* .
         WIDTH0*) +
         (A2FB . A3FB . A4FB . A5FB
         . A6FB . A7FB . A8FB . CLOCKCMD* . WIDTH1 .
         WIDTH0))*
``` where the AxFB signals are the Q outputs of the flip-flops and are provided to the D inputs of the flip-flops as feedback terms. The outputs of the flip-flops are enabled by the ADDROE signal, while the clocking is performed by the respective AxC signal. It is noted that the address is incremented on the rising edge of the CLOCKCMD signal, which may actually provide a precompletion increment. This increment is provided because according to the XLE* equation the data is latched into the latching transceivers 100-106 for presentation to the bus 22 until the next rising edge of the BCLK signal, so that should the CLOCKCMD signal increment the address early, as would occur at the last cycle of a burst due to the removal of the IORC* signal prior to completion of the data portion of the cycle.

The DMA read counter 126 is similar, but the CLOCKCMD signal is simpler because of fewer race terms. Additionally, the DMA read counter 126 advances on the IOWC* signal in contrast to the IORC* signal of the DMA write counter 124. The equations are as follows:

$$ADDROE = DMAACT \cdot DMAWR*$$

so that the address values are being provided by the counter 126 only when a DMA cycle is active and reads from memory are occurring. The CLOCKCMD signal is used to advance the counter 126 and is developed as follows:

*CLOCKCMD=((DMAACT·DMABU\*·IOWC)+(D-MAACT·DMABU·LEXRDY·DBCLKB)\** where the DBCLKB signal is a delayed version of the BCLK signal to prevent any race conditions with LEXRDY which is developed by latch 132. The DBCLKB signal for the read counter 126 is developed as follows:

```
DBCLKA   = BCLK* . IOWC
DBCLKB   = DBCLKA
The counter 126 counting equations are:
A0    := A0FB*
A0C   =    ((CLOCKCMD* . WIDTH1* . WIDTH0) +
           (A0FB . CLOCKCMD* . WIDTH1* . WIDTH0*) +
           (A0FB . CLOCKCMD* . WIDTH1 . WIDTH0))*
A1    := A1FB*
A1C   = ((A0FB . CLOCKCMD* . WIDTH1* . WIDTH0) +
           (CLOCKCMD* . WIDTH1* . WIDTH0*) +
           (A1FB . CLOCKCMD* . WIDTH1 . WIDTH0))*
A2    := A2FB*
A2C   = ((A0FB . A1FB . CLOCKCMD* . WIDTH1* .
           WIDTH0) +
           (A1FB . CLOCKCMD* . WIDTH1* .
           WIDTH0*) +
           (CLOCKCMD* . WIDTH1 .
           WIDTH0))*
A3    := A3FB*
A3C   = ((A0FB . A1FB . A2FB . CLOCKCMD* . WIDTH1*
           . WIDTH0) +    (A1FB . A2FB . CLOCKCMD*
           . WIDTH1* . WIDTH0*) +    (A2FB .
           CLOCKCMD* . WIDTH1 . WIDTH0))*
A4    := A4FB*
A4C   = ((A0FB . A1FB . A2FB . A3FB . CLOCKCMD* .
           WIDTH1* . WIDTH0) +
           (A1FB . A2FB . A3FB . CLOCKCMD* .
           WIDTH1* . WIDTH0*) +
           (A2FB . A3FB . CLOCKCMD* .
           WIDTH1 . WIDTH0))*
A5    := A5FB*
A5C   = ((A0FB . A1FB . A2FB . A3FB . A4FB
           CLOCKCMD* . WIDTH1* . WIDTH0) +
           (A1FB . A2FB . A3FB . A4FB
           CLOCKCMD* . WIDTH1* . WIDTH0*) +
           (A2FB . A3FB . A4FB .
           CLOCKCMD* . WIDTH1 . WIDTH0))*
A6    := A6FB*
A6C   = ((A0FB . A1FB . A2FB . A3FB . A4FB . A5FB
           . CLOCKCMD* . WIDTH1* . WIDTH0) +
           (A1FB . A2FB . A3FB . A4FB . A5FB
           . CLOCKCMD* . WIDTH1* . WIDTH0*) +
           (A2FB . A3FB . A4FB . A5FB
           . CLOCKCMD* . WIDTH1 . WIDTH0))*
A7    := A7FB*
A7C   = ((A0FB . A1FB . A2FB . A3FB . A4FB . A5FB
           . A6FB . CLOCKCMD* . WIDTH1* . WIDTH0) +
           (A1FB . A2FB . A3FB . A4FB . A5FB
           . A6FB . CLOCKCMD* . WIDTH1* . WIDTH0*) +
           (A2FB . A3FB . A4FB . A5FB
           . A6FB . CLOCKCMD* . WIDTH1 . WIDTH0))*
A8    := A8FB*
A8C   = ((A0FB . A1FB . A2FB . A3FB . A4FB . A5FB
           . A6FB . A7FB . CLOCKCMD* . WIDTH1* . WIDTH0)
           +
           (A1FB . A2FB . A3FB . A4FB . A5FB
           . A6FB . A7FB . CLOCKCMD* . WIDTH1* .
           WIDTH0*) +
           (A2FB . A3FB . A4FB . A5FB
           . A6FB . A7FB . CLOCKCMD* . WIDTH1 .
           WIDTH0))*
A9    := A9FB*
A9C   = ((A0FB . A1FB . A2FB . A3FB . A4FB . A5FB
           . A6FB . A7FB . A8FB . CLOCKCMD* . WIDTH1* .
           WIDTH0) +
           (A1FB . A2FB . A3FB . A4FB . A5FB
           . A6FB . A7FB . A8FB . CLOCKCMD* . WIDTH1* .
           WIDTH0*) +
           (A2FB . A3FB . A4FB . A5FB
```

-continued
```
           . A6FB . A7FB . A8FB . CLOCKCMD* . WIDTH1 .
           WIDTH0))*
``` where the A×FB signals are the feedback signals provided to the D inputs of the flip-flops and are the Q outputs of the flip-flops. The outputs of the flip-flops are enabled by the ADDROE signal and the clocking signal for each flip-flop is provided by the respective AxC signal. It is again noted that the addresses are incremented on the rising edge of the CLOCKCMD signal, as in the counter 124. This is acceptable in this case because the data will have been stored in the SRAM's 116-122 prior to this edge due to the operation of the SRAMW* equation.

Not shown in FIG. 2 or the above equations for clarity purposes are the transceivers and terms necessary for the host CPU to transfer data with the memory devices 116-122. The transceivers would be connected between the host CPU data lines and the D0, D1, D2, and D3 data lines as appropriate. Additional terms would be provided in the PAL's in the control logic 130 based on the DMAACT signal being low to avoid address and data bus contention problems. The terms are necessarily dependent on the particular timings and signals of the host CPU, with such terms being capable of being readily developed by those skilled in the art.

Figure 3:
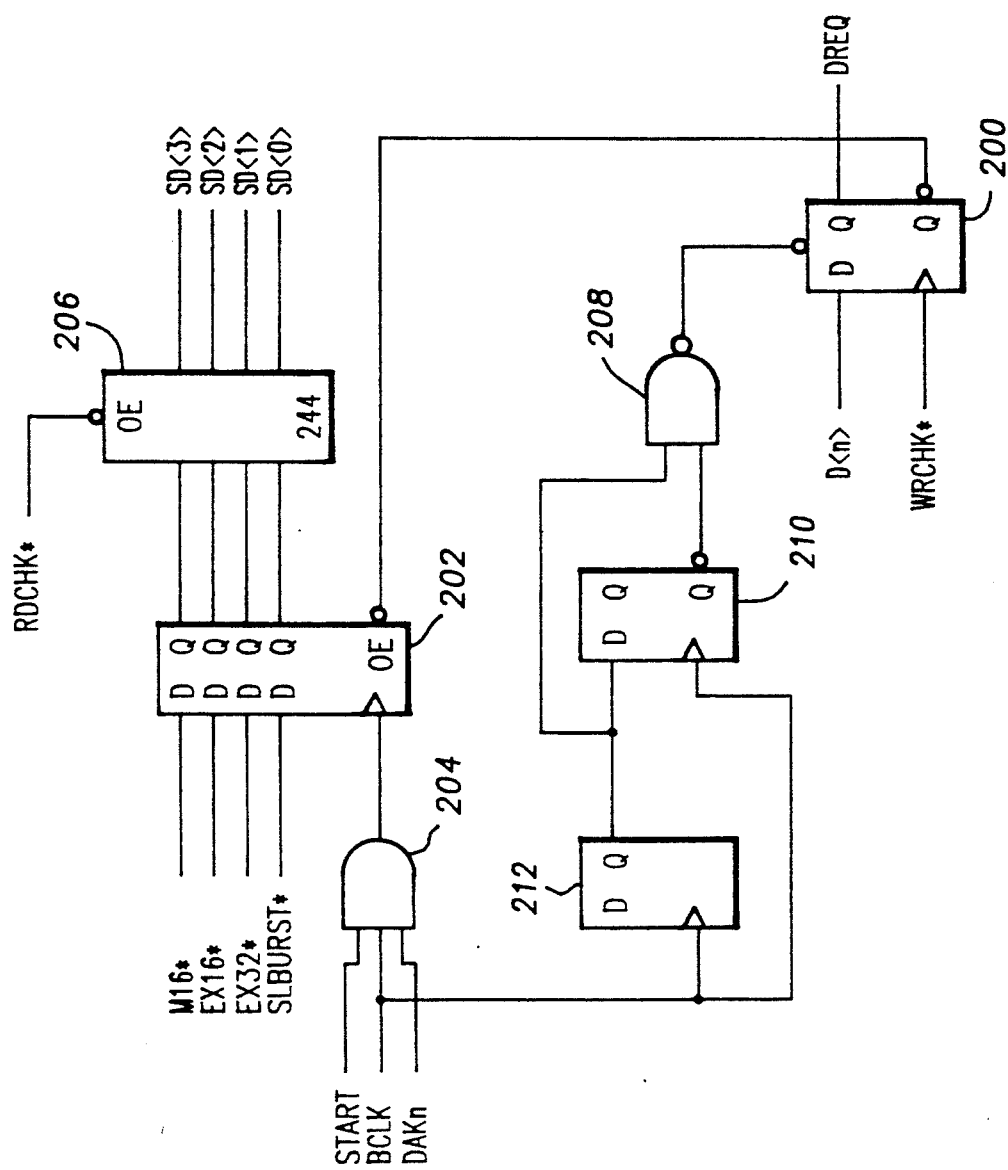
FIG. 3 is a schematic diagram of the address control signal latch circuitry according to the present invention.

Thus it can be seen that the counters 124 and 126 will readily transfer data of the desired width to allow burst operations, depending on the speed of the various memories 118-122 and the transceivers 100-106 and 108-114, or at least allow the removal of assembly/disassembly cycles. It is necessary however to be able to determine the actual memory width of the block of memory being addressed in the DMA transfer operation. As this width can vary from system to system, depending upon the particular application software being utilized and the memory boards installed in the various systems, a method is needed to be able to positively and easily determine the memory data width and thus be able to properly set the width of the DMA transfer system. A schematic of this is shown in FIG. 3. An I/O port is utilized which contains one write bit and 4 read bits. Prior to initializing this I/O port location, the desired DMA channel is set up to point to the proper memory address and is set for single transfer, 8 bit wide mode operation. After the DMA controller has been properly initialized, a one value is written to the proper bit location in the I/O port to appear at the D input of a flip-flop 200. The clocking input to the flip-flop 200 is determined by a signal referred to as WRCHK*, so that when data is being written to the I/O port a positive edge is developed at the time when the data is valid. After the flip-flop 200 has been clocked, the non-inverting output, which is connected to the DMA request signal for the desired DMA channel goes high, thus initiating a DMA request. This triggers the sequence of operations used to read the parameters necessary to determine the memory size. The four bus signals M16*, EX16*, EX32* and SLBURST* are connected to the four D inputs of a four bit flip-flop 202. These are the four signals necessary to determine whether the memory is burstable and to determine its data width. The gate of the flip-flop 202 is connected to the output of a three input AND gate 204 whose inputs are the START signal, the BCLK signal and the DAKn signal appropriate for the desired DMA channel. Thus when the START* signal goes low to indicate that a memory cycle is occurring and that DMA channel is active, on the rising edge of the BCLK signal the data is transferred into the flip-flop 202. The data is then transferred from the outputs of the flip-flop 202 through a buffer 206 to four bits of the system data bus, in the preferred embodiment SD<3:0>. The output enable of the buffer 206 can be connected to a signal which indicates that the I/O port is being read or can be set to drive the data lines during the pending DMA operation so that the data is automatically transferred to the memory location being addressed and thus is obtainable without further I/O operations by the processor.

The flip-flop 200 must be cleared after the one DMA cycle and so the inverted clear input is connected to the output of a two input NAND gate 208. One input to the NAND gate 208 is provided by the inverted output of a D-type flip-flop 210, while a second input is connected to the non-inverting output of a D-type flip-flop 212. The D input of the flip-flop 210 is connected to the non-inverting output of the flip-flop 212, while the D input to the flip-flop 212 is connected to the DAKn signal. The clocking signal for the two flip-flops 210 and 212 is provided by the BCLK signal. By this configuration a single clear pulse is developed after two BCLK signal cycles and the DMA request is removed, so that only a single transfer has occurred. After the DMA request is completed the processor 10 is free to read the I/O port or the memory location as appropriate for the transfer technique. In this way the processor 10 can evaluate the four bits to determine if bursting is possible and to set the proper memory width.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A variable width memory access device connected to an n byte wide system data bus, n being at least 2, said variable width memory access device comprising:
   an n byte wide internal data bus, said internal data bus being organized in n single byte wide lanes;
   transceiver means having a total width of n bytes and being controllable in single byte increments, said transceiver means being coupled to the system data bus and said internal data bus;
   data copy means connected between selected byte lanes of said internal data bus for transferring data between said selected byte lanes;
   memory means having a total width of n bytes and being controllable in single byte increments, said memory means being coupled to said internal data bus and having a plurality of address inputs;
   means for indicating a desired width of a data transfer;
   counter means coupled to said desired width indicating means and providing address outputs coupled to said memory means, said counter means incrementing said address outputs based on said desired data transfer width;
   control means coupled to said counter means, said desired data width means, said memory means, said data copy means and said transceiver means for controlling data transfer through said transceiver means based on said desired data transfer width, through said data copy means based on said desired data width and said address provided by said counter means, and with said memory means based on said desired data width and said address provided by said counter means, so that said each of said memory means byte increments is fully utilized based on each of said desired data transfer widths.

2. The device of claim 1, wherein said counter means includes:
   a read counter means for providing addresses to said memory means on data transfers to said memory means;
   a write counter means for providing addresses to said memory means on data transfers from said memory means;
   both said read counter means and said write counter means incrementing said address outputs based on said desired data transfer width; and
   means for selecting said read counter means or said write counter means to provide addresses to said memory means.

3. The device of claim 2, wherein said transceiver means includes latches to maintain data received from said internal data bus.

4. The device of claim 1, wherein n is 4, said data copy means includes transceiver means connected between the least significant byte lane and each of said other byte lanes and transceiver means connected between the second least significant byte lane and the most significant byte lane, and said desired data transfer width means indicates data transfers one, two or four bytes in width.

* * * * *